US012794889B2

(12) United States Patent
Kitai

(10) Patent No.: US 12,794,889 B2
(45) Date of Patent: Nov. 10, 2026

(54) PERMITTING PEER-TO-PEER CONNECTION BASED ON OUTPUT TARGET DATA

(71) Applicant: FUJIFILM Business Innovation Corp., Tokyo (JP)

(72) Inventor: Tsubasa Kitai, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 18/594,003

(22) Filed: Mar. 4, 2024

(65) Prior Publication Data

US 2025/0016159 A1 Jan. 9, 2025

(30) Foreign Application Priority Data

Jul. 3, 2023 (JP) ................................ 2023-109540

(51) Int. Cl.

| | |
|---|---|
| ***G06F 21/00*** | (2013.01) |
| ***H04L 9/08*** | (2006.01) |
| ***H04L 9/32*** | (2006.01) |
| ***H04L 9/40*** | (2022.01) |
| ***H04L 67/104*** | (2022.01) |

(52) U.S. Cl.

CPC ............ *H04L 63/10* (2013.01); *H04L 9/0894* (2013.01); *H04L 9/3247* (2013.01); *H04L 67/104* (2013.01)

(58) Field of Classification Search

CPC ..... H04L 63/10; H04L 9/0894; H04L 9/3247; H04L 67/104

See application file for complete search history.

(56) References Cited

U.S. PATENT DOCUMENTS

| | | | | |
|---|---|---|---|---|
| 6,795,205 | B1 * | 9/2004 | Gacek | G06Q 30/0283 705/14.1 |
| 8,325,358 | B2 * | 12/2012 | Hosoi | G06F 3/1285 358/1.14 |
| 8,789,144 | B2 * | 7/2014 | Mazzaferri | G06F 21/10 726/4 |
| 9,286,009 | B2 | 3/2016 | Kawasaki | |
| 9,628,991 | B2 | 4/2017 | Nakamura | |
| 10,042,590 | B2 | 8/2018 | Kawasaki | |
| 10,477,399 | B2 | 11/2019 | Nakamura | |
| 10,547,765 | B2 | 1/2020 | Kawasaki | |
| 10,732,911 | B2 | 8/2020 | Tsuchiya | |

(Continued)

FOREIGN PATENT DOCUMENTS

| | | |
|---|---|---|
| JP | 6144934 | 6/2017 |
| JP | 2017098899 | 6/2017 |

(Continued)

*Primary Examiner* — William A Corum, Jr.

(74) *Attorney, Agent, or Firm* — JCIPRNET

(57) ABSTRACT

An information processing system includes one or more processors configured to determine whether or not an approval for output of output target data by a third party having an approval authority is obtained for the output target data, permit connection with an output device used for outputting the output target data for which the approval is obtained, in a peer-to-peer manner, as one of methods for connection with the output device, and not permit connection with an output device used for outputting the output target data for which the approval is not obtained, in a peer-to-peer manner, as a method for connection with the output device.

6 Claims, 6 Drawing Sheets

(56) References Cited

U.S. PATENT DOCUMENTS

| | | | | |
|---|---|---|---|---|
| 11,019,105 | B2 | 5/2021 | Nakamura | |
| 11,340,849 | B2 | 5/2022 | Tsuchiya | |
| 2002/0114004 | A1* | 8/2002 | Ferlitsch | G06F 3/1203 358/1.15 |
| 2006/0290967 | A1* | 12/2006 | Sumitomo | G03G 21/04 358/1.14 |
| 2013/0057913 | A1* | 3/2013 | Park | H04W 12/069 358/1.15 |
| 2016/0323478 | A1* | 11/2016 | Tsutsumi | H04N 1/00307 |
| 2016/0366289 | A1* | 12/2016 | Kitamura | G06F 3/1292 |
| 2018/0121148 | A1* | 5/2018 | Tye | G06F 3/1222 |
| 2021/0383029 | A1* | 12/2021 | Tada | G06T 11/60 |
| 2022/0353678 | A1* | 11/2022 | Miyake | H04W 12/69 |

FOREIGN PATENT DOCUMENTS

| | | |
|---|---|---|
| JP | 6238528 | 11/2017 |
| JP | 6342032 | 6/2018 |
| JP | 2019068219 | 4/2019 |
| JP | 2019140539 | 8/2019 |
| JP | 7199797 | 1/2023 |

* cited by examiner

PERMITTING PEER-TO-PEER CONNECTION BASED ON OUTPUT TARGET DATA

CROSS-REFERENCE TO RELATED APPLICATIONS

This application is based on and claims priority under 35 USC 119 from Japanese Patent Application No. 2023-109540 filed Jul. 3, 2023.

BACKGROUND

(i) Technical Field

The present disclosure relates to an information processing system and a non-transitory computer readable medium.

(ii) Related Art

In a case where a terminal apparatus gives an instruction about printing to an image forming apparatus, the terminal apparatus and the image forming apparatus may be connected by a peer-to-peer method such as Wi-Fi direct (registered trademark). When such a connection method is used, for example, even in a case where the terminal apparatus cannot be connected to a network to which the image forming apparatus is connected, it is possible to connect the terminal apparatus and the image forming apparatus to perform printing.

Incidentally, a confidential information leakage prevention measure such as leaving an image log of a print content and requiring an approval by a third party in a case where printing is performed outside a base of an organization may be applied to a printing system used in a company or the like. However, when connection by the peer-to-peer method (hereinafter, referred to as "peer-to-peer connection") can be performed, since the terminal apparatus and the image forming apparatus can be directly connected, it becomes possible to bypass such a confidential information leakage prevention measure, and a risk of confidential information leakage may be caused. Thus, under certain conditions, the peer-to-peer connection is restricted. Japanese Patent No. 6342032 discloses a printer that prohibits a user from using a Wi-Fi direct function in a case of using an IP filter.

SUMMARY

When the peer-to-peer connection is uniformly restricted based on an authentication condition such as an IP filter and presence or absence of log-in, in a case where a situation in which the terminal apparatus cannot be connected to the network to which the image forming apparatus is connected occurs or the like, the terminal apparatus cannot give the instruction about printing to the image forming apparatus, and convenience is lost. Note that, this problem exists in common in a case where one terminal apparatus gives an instruction to output information to another terminal apparatus. An output medium of information is not limited to printing by the image forming apparatus, and the same applies to the case of voice output or display on a display device.

Aspects of non-limiting embodiments of the present disclosure relate to improving convenience in peer-to-peer connection between terminal apparatuses as compared with a configuration for uniformly controlling whether or not the peer-to-peer connection is permitted based on an authentication condition or the like.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an information processing system including one or more processors configured to determine whether or not an approval for output of output target data by a third party having an approval authority is obtained for the output target data, permit connection with an output device used for outputting the output target data for which the approval is obtained, in a peer-to-peer manner, as one of methods for connection with the output device, and not permit connection with an output device used for outputting the output target data for which the approval is not obtained, in a peer-to-peer manner, as a method for connection with the output device.

BRIEF DESCRIPTION OF THE DRAWINGS

An exemplary embodiment of the present disclosure will be described in detail based on the following figures, wherein.

DETAILED DESCRIPTION

Hereinafter, an exemplary embodiment of the present disclosure will be described in detail with reference to the accompanying drawings.

Configuration of Information Processing System

Figure 1:
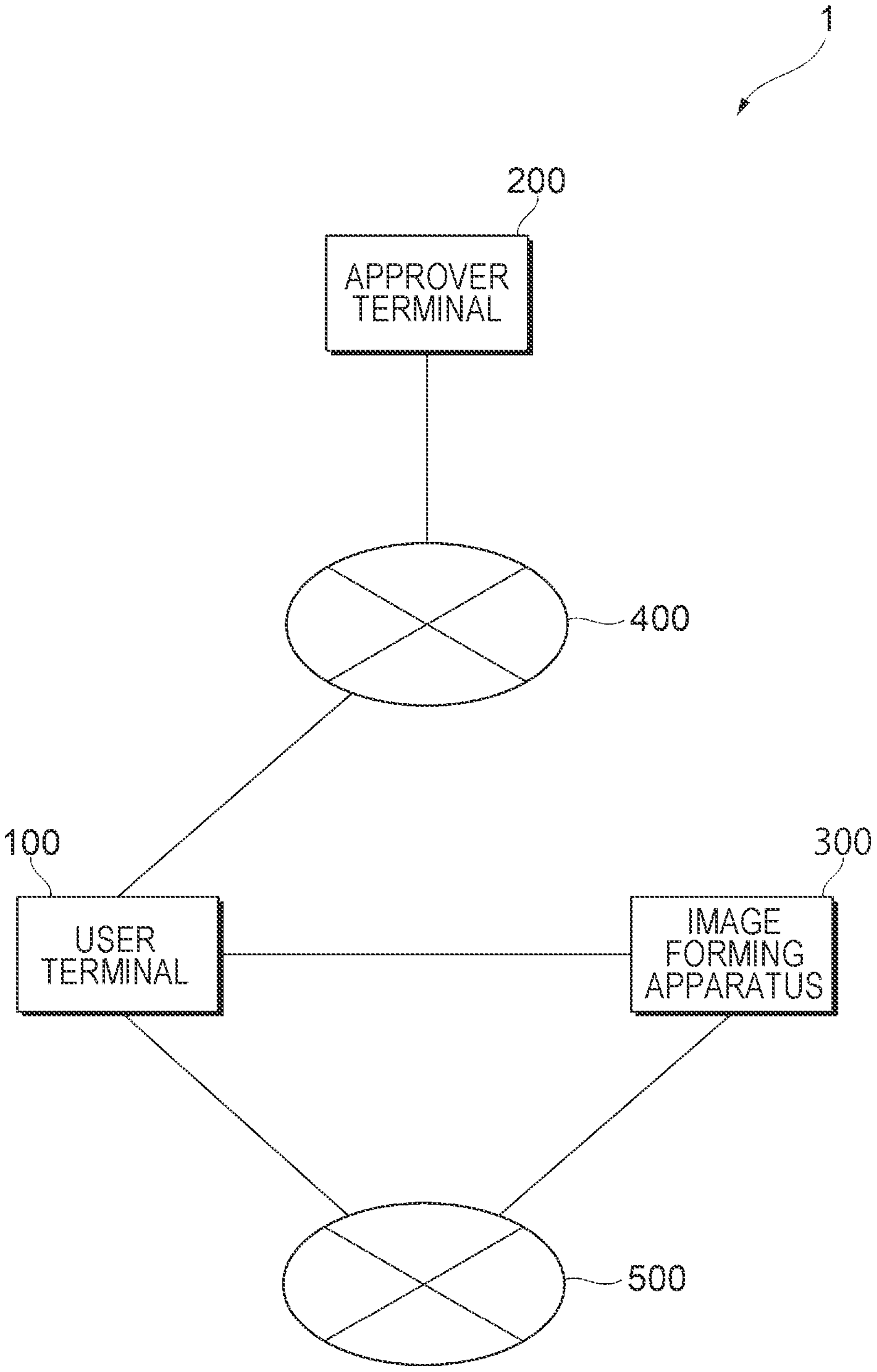
FIG. 1 is a diagram illustrating a configuration example of an information processing system to which the present exemplary embodiment is applied.

FIG. 1 is a diagram illustrating a configuration example of an information processing system 1 to which the present exemplary embodiment is applied. The information processing system 1 includes a user terminal 100, an approver terminal 200, and an image forming apparatus 300. The user terminal 100 and the approver terminal 200 are connected to each other via a network 400. On the other hand, the user terminal 100 and the image forming apparatus 300 can be connected not only via a network 500 but also in a peer-to-peer manner without via the network 500. For example, from the viewpoint of security, connecting the user terminal 100 to the network 500 may be desirably avoided. In addition, the user terminal 100 and the image forming apparatus 300 may not be able to be connected via the network 500 due to communication trouble or the like. In these cases, the user terminal 100 and the image forming apparatus 300 are connected in the peer-to-peer manner, and thus can perform communication without via the network 500. An example of the peer-to-peer connection includes Wi-Fi direct and the like.

However, the user terminal 100 and the image forming apparatus 300 are directly connected, and thus, a security risk of leakage of confidential information is caused. For example, in a case where a server on the network 500 stores a log of output processing of the image forming apparatus 300 in output by network connection, when the output is performed by the peer-to-peer connection, confidential information may be output without leaving a log. In the present exemplary embodiment, the peer-to-peer connection between the user terminal 100 and the image forming apparatus 300 is allowed. Further, in a case where the user terminal 100 and the image forming apparatus 300 are connected in the peer-to-peer manner, an approval for output of data to be output (hereinafter, the data to be output is referred to as "output target data") by the approver terminal 200 is required, and thus, whether or not the output is permitted is managed for each data.

The user terminal 100 is a terminal operated by a user. The user terminal 100 receives operations by the user, and performs various kinds of information processing such as an output instruction of the output target data. Examples of the user terminal 100 include a smartphone, a tablet, a desktop PC, and a notebook PC.

When the user terminal 100 receives an instruction to output data by using an external apparatus (for example, the image forming apparatus 300) connected in the peer-to-peer manner, the user terminal 100 determines whether or not approval for the output of the data by a third party having an approval authority (hereinafter, the third party having the approval authority is referred to as an "approver") is obtained for the output target data. When the approval for the output target data by the approver is obtained, the user terminal 100 permits the output of the output target data. On the other hand, in a case where the approval by the approver is not obtained, the output of the output target data is not permitted.

In addition, in a case where the approval by the approver is not obtained for the output of the output target data, the user terminal 100 gives, to the approver, a notification for requesting the approval for the output of the output target data. Here, as the approver, various cases are considered in accordance with setting of an approval authority for each data. For example, a senior of the user may be the approver, or an owner, a creator, or the like of the data may be the approver. In addition, a different approver may be set for each data. Information on the owner or the creator may be recorded in metadata or the like depending on data. In such a case, the information on the owner or the creator may be read from the output target data and set as the approver. The information on the approver may be retained in the user terminal 100 in advance, or may be read and acquired from the output target data in a case where the information is recorded in the data as described above.

The approver terminal 200 is a terminal operated by the approver. The approver terminal 200 is used for the approver to give the approval for the output of the output target data. Examples of the approver terminal 200 include a smartphone, a tablet, a desktop PC, and a notebook PC.

The approver terminal 200 receives, from the user terminal 100, the output target data and the notification for requesting the approval for the output of the output target data. When the approver operates the approver terminal 200 to give the approval for the output of the output target data, the approver terminal 200 gives, to the user terminal 100, the approved output target data and a notification indicating that the output of the output target data is approved. The approval for the output target data by the approver is given by performing processing indicating that the output target data is approved. Examples of the processing indicating that the output target data is approved include attaching an electronic signature by the approver to the output target data.

The image forming apparatus 300 refers to an apparatus having a function of reading an image, a function of forming an image, and the like. The image forming apparatus 300 according to the present exemplary embodiment has, for example, a copy function, a print function, a scan function, a facsimile function, and the like. In addition, the image forming apparatus 300 has a communication function and communicates with the user terminal 100. The image forming apparatus 300 prints the output target data in response to an instruction to output the output target data from the user terminal 100.

Hardware Configuration of Terminal Apparatus

Figure 2:
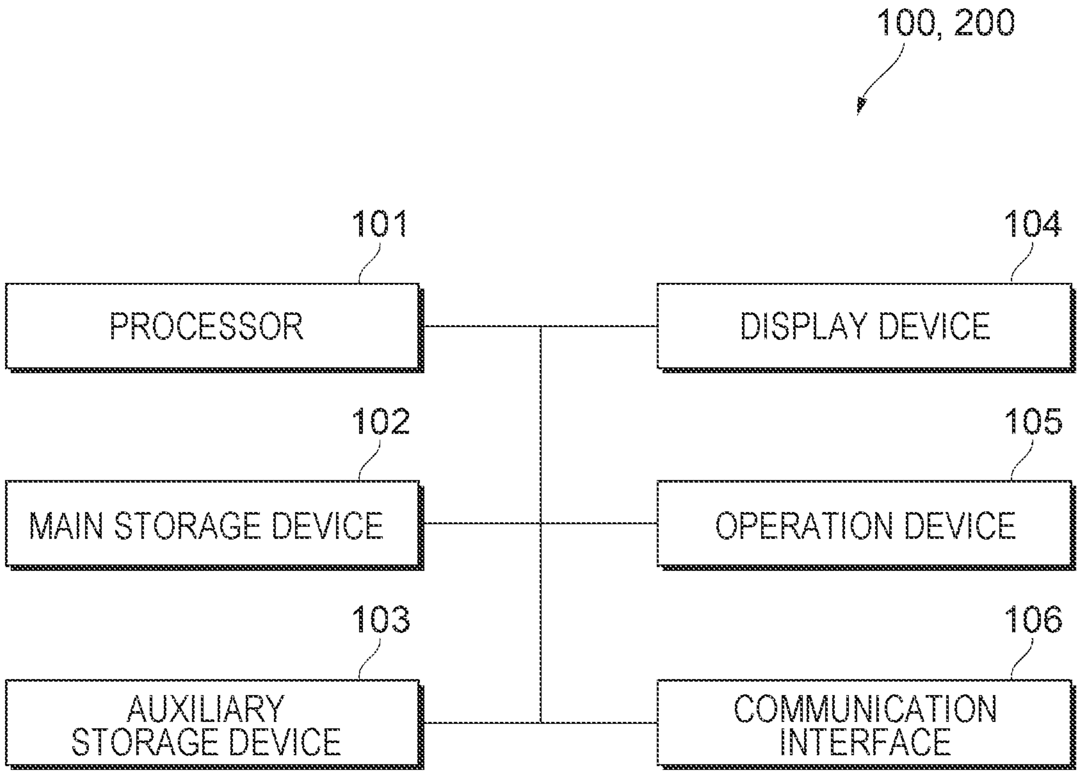
FIG. 2 is a diagram illustrating a hardware configuration example of a user terminal and an approver terminal.

FIG. 2 is a diagram illustrating an example of a hardware configuration of the user terminal 100 and the approver terminal 200. The user terminal 100 illustrated in FIG. 2 includes one or more processors 101 that are arithmetic units, and a main storage device (main memory) 102 and an auxiliary storage device 103 that are storage units. The processor 101 implements each function of the user terminal 100 by reading a program stored in the auxiliary storage device 103 into the main storage device 102 and executing the program. For example, a central processing unit (CPU), a micro processing unit (MPU), a graphics processing unit (GPU), a digital signal processor (DSP), or the like is used as the processor 101. For example, a random access memory (RAM) is used as the main storage device 102. For example, a magnetic disk device, a solid state drive (SSD), or the like is used as the auxiliary storage device 103.

In addition, the user terminal 100 illustrated in FIG. 2 includes a display device 104 for causing the user to visually recognize display information and an operation device 105 for receiving an operation from the user. For example, a display or the like is used as the display device 104. For example, a keyboard, a mouse, a touch panel, or the like is used as the operation device 105. In addition, the user terminal 100 includes a communication interface 106 for connection with an external apparatus. Note that, the configuration of the user terminal 100 illustrated in FIG. 2 is merely an example, and the user terminal 100 used in the present exemplary embodiment is not limited to the configuration example of FIG. 2. For example, a non-volatile memory such as a flash memory or a read only memory (ROM) may be used as the storage device. Note that, since the approver terminal 200 has a hardware configuration similar to the user terminal 100, description thereof is omitted.

Configuration of Image Forming Apparatus

Figure 3:
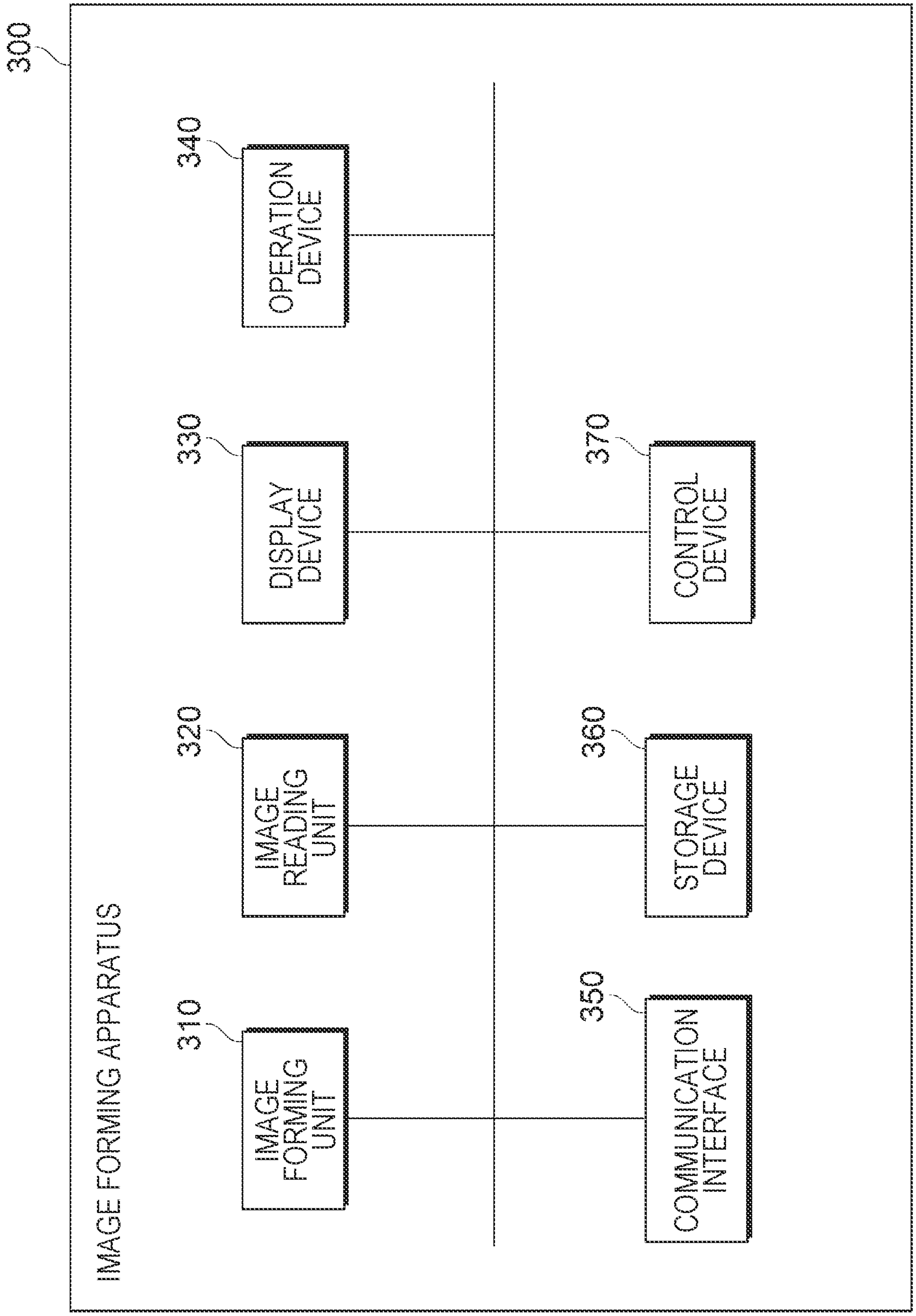
FIG. 3 is a diagram illustrating a configuration example of an image forming apparatus.

FIG. 3 is a diagram illustrating a configuration example of the image forming apparatus 300. As illustrated in FIG. 3, the image forming apparatus 300 includes an image forming unit 310, an image reading unit 320, a display device 330, an operation device 340, a communication interface 350, a storage device 360, and a control device 370.

The image forming unit 310 forms an image based on image data on a sheet which is an example of a recording material, by using an image forming material. For example, an electrophotographic system for transferring toner stuck to a photoreceptor onto a recording material to form an image, an inkjet method for ejecting ink onto a recording material to form an image, or the like is used as a method for forming an image on a recording material.

The image reading unit 320 includes a so-called scanner device, optically reads an image on a set document, and generates data of the read image. For example, a charge coupled device (CCD) method for reducing reflected light of light radiated from a light source to a document by a lens and receiving the reduced reflected light by a CCD or a contact image sensor (CIS) method for receiving reflected light of light sequentially radiated from a light emitting diode (LED) light source to a document by a CIS is used as a method for reading an image.

The display device 330 displays an information image for presenting various kinds of information to the user, a preview image of an image which is a target of processing such as reading or output, an operation image for the user to perform an operation, and the like. The display device 330 includes, for example, a liquid crystal display. The display device 330 and the operation device 340 may be combined together as a user interface unit for the user to input and output information to and from the image forming apparatus 300.

The operation device 340 is a device for the user to perform an operation such as input of a command or data. The operation device 340 includes, for example, a hardware key, a touch sensor that outputs a control signal corresponding to a position pressed or touched by a finger or the like, and the like. The display device 330 may be a touch panel in which a touch sensor and a liquid crystal display constituting the display device 330 are combined.

The communication interface 350 is an interface for transmitting and receiving commands and data to and from an external apparatus. An interface corresponding to a communication method with an external apparatus is used as the communication interface 350. The connection with the external apparatus may be performed via a network (for example, the network 500) or may be performed by the peer-to-peer connection. A communication line may be a wired line or a wireless line. Further, in a case where the image forming apparatus 300 has a facsimile function, the communication interface 350 includes an interface for a telephone line.

The storage device 360 stores programs and data to be executed by the control device 370, log data generated through various operations, such as the data of the image read by the image reading unit 320, and other various kinds of data. The storage device 360 is implemented by, for example, a storage device such as a magnetic disk device or an SSD.

The control device 370 includes a processor that is an arithmetic unit and a memory that is a storage unit, and controls the image forming apparatus 300 by reading the program stored in the storage device 360 into the memory and executing the program. Examples of the control performed by the control device 370 include control of output and control of communication. Specifically, the control device 370 receives a print instruction from the user and performs printing. In addition, the control device 370 performs control such as whether to perform communication between the user terminal 100 and the image forming apparatus 300 via the network 500 or by the peer-to-peer method. A CPU, an MPU, a GPU, a DSP, or the like is used as the processor. For example, a dynamic random access memory (DRAM) or the like is used as the memory.

Functional Configuration of User Terminal

Figure 4:
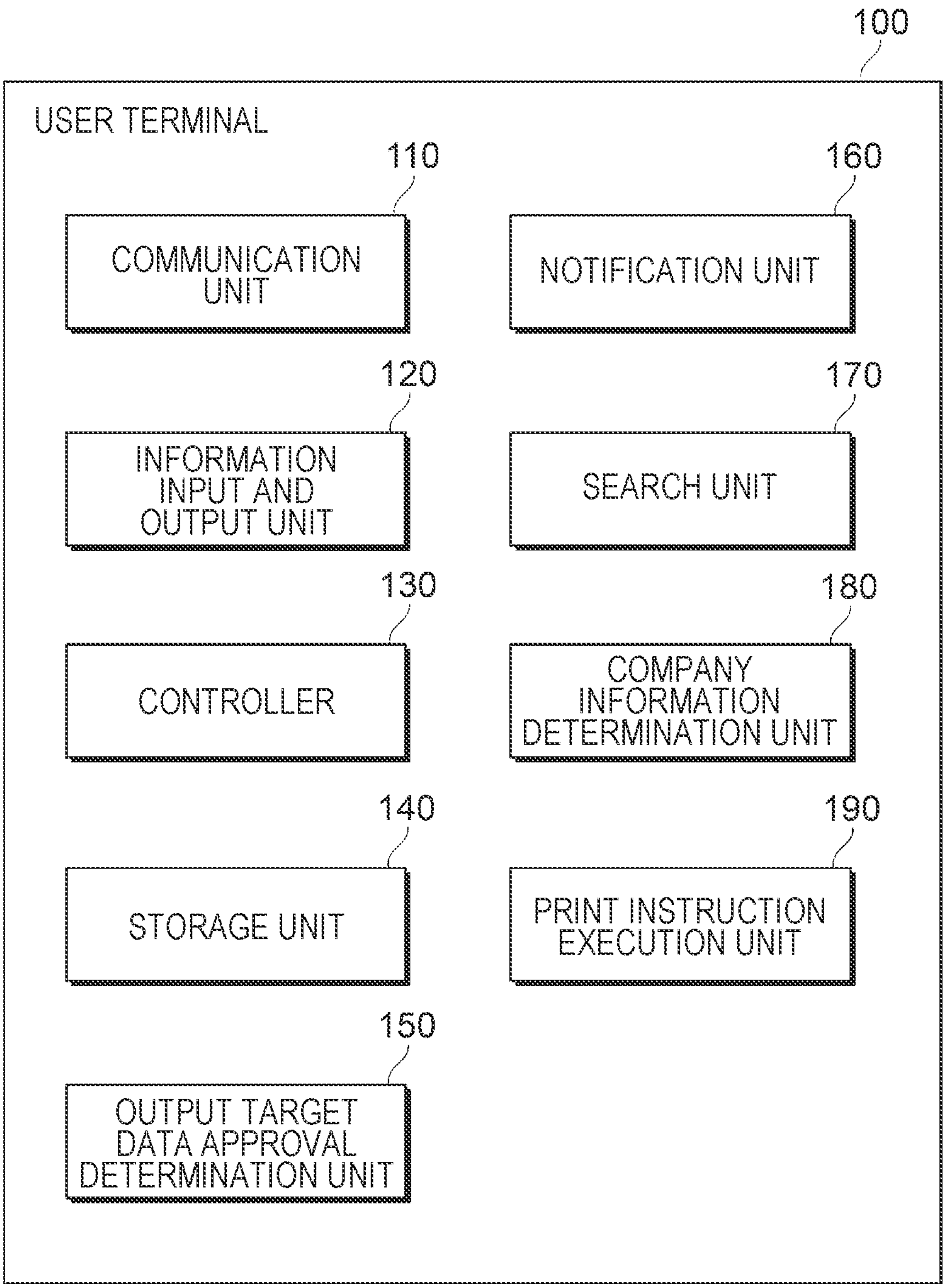
FIG. 4 is a diagram illustrating an example of a functional configuration of the user terminal.

FIG. 4 is a diagram illustrating an example of a functional configuration of the user terminal 100. The user terminal 100 includes a communication unit 110, an information input and output unit 120, a controller 130, a storage unit 140, an output target data approval determination unit 150, a notification unit 160, a search unit 170, a company information determination unit 180, and a print instruction execution unit 190. Various operations in the user terminal 100 are executed by the processor 101 reading the program into the main storage device 102 and executing the program.

The communication unit 110 communicates with an external apparatus. For example, the communication unit 110 communicates with the approver terminal 200 via the network 400. In addition, the communication unit 110 can communicate with the image forming apparatus 300 via the network 500. The communication unit 110 can also communicate with the image forming apparatus 300 by the peer-to-peer connection without via the network 500.

The information input and output unit 120 displays a screen such as an operation screen or an information presentation screen, and receives an input operation by the user. The user performs an input operation according to the operation screen or the like displayed on the display device 104, and thus, various control commands and data are input. For example, the information input and output unit 120 displays an operation screen or the like to the user, and receives an instruction to output the output target data from the user.

The controller 130 controls the operation of the user terminal 100. For example, the controller 130 controls communication between the user terminal 100 and an external apparatus. More specifically, the controller 130 controls, for example, whether to perform communication between the user terminal 100 and the image forming apparatus 300 via the network 500 or by the peer-to-peer method. In addition, the controller 130 transmits an instruction to each functional unit and receives a response. More specifically, for example, in a case where the approval for the output of the output target data by the approver is obtained, the controller 130 permits the output of the output target data. On the other hand, in a case where the approval is not obtained, control is performed such that the output of the output target data is not permitted, or the like.

The storage unit 140 stores various kinds of data and programs. Specifically, the storage unit 140 stores a program for controlling the operation of the user terminal 100, the output target data to be output to the image forming apparatus 300, data on the user, and the like. Examples of the data on the user include attributes such as a name and a job title of the user, information on an organization to which the user belongs, information on the senior of the user, information on the approver, and the like. In a case where the approver is the senior, information indicating that the senior is the approver may be used instead of the information on the approver. In addition, in a case where the approver is different for each data, information on each approver may be stored in association with the data. Further, information on an organization to which the image forming apparatus 300 connected in the peer-to-peer manner belongs may be stored.

The output target data approval determination unit 150 determines whether or not the approval by the approver is obtained for the output target data. Here, a method by which the output target data approval determination unit 150 determines whether or not the approval for the output of the output target data by the approver is obtained will be described. When it is determined whether or not the approval by the approver is obtained, the output target data approval determination unit 150 checks the output target data. More specifically, the output target data approval determination unit 150 verifies whether or not the output target data is data approved by the approver. The data approved by the approver refers to data on which processing is performed by the approver. When the output target data is verified, in a case where information indicating that processing is performed by the approver is extracted from the output target data, the output target data approval determination unit 150 determines that the approval for the output target data by the approver is obtained.

Examples of the processing of the output target data by the approver include the electronic signature of the approver. In a case where the fact that the electronic signature by the approver is attached to the output target data can be verified, the output target data approval determination unit 150 determines that the approval for the output target data by the approver is obtained.

In a case where the approval for the output target data by the approver is not obtained, the notification unit 160 gives, to the approver, the notification for requesting the approval for the output of the output target data. In addition, the notification unit 160 transmits the notification together with the output target data when the notification for requesting the approval is given. Note that, in a case where the approver can acquire the output target data, only a request notification including identification information of the output target data may be used.

The search unit 170 searches for the image forming apparatus 300 that can be connected to the user terminal 100 in the peer-to-peer manner via the communication line used for the peer-to-peer connection. Note that, in a case where the image forming apparatus 300 that can be connected to the user terminal 100 in the peer-to-peer manner is detected, the search unit 170 may acquire information indicating the organization to which the image forming apparatus 300 belongs, from the detected image forming apparatus 300. Here, the organization refers to, for example, an organization in which the image forming apparatus 300 is installed and used. A protocol such as SNMP may be used to acquire the organization information.

The company information determination unit 180 determines whether or not the organization acquired from the image forming apparatus 300 connected to the user terminal 100 by the peer-to-peer connection and the organization of the user managed by the storage unit 140 coincide.

The print instruction execution unit 190 transmits the print instruction to the image forming apparatus 300. Specifically, in a case where the controller 130 permits the output of the output target data, the print instruction execution unit 190 transmits the print instruction to the image forming apparatus 300.

Description of Operation Outline of Information Processing System

In the present exemplary embodiment, an operation in a case where the user terminal 100 and the image forming apparatus 300 are connected in the peer-to-peer manner to perform output will be described. In a case where it is necessary to perform peer-to-peer connection because connection to the network 500 cannot be established, first, the user terminal 100 searches for the image forming apparatus 300 that can be connected in the peer-to-peer manner via the communication line used for the peer-to-peer connection. In a case where the user terminal 100 detects the image forming apparatus 300 that can be connected in the peer-to-peer manner, the user terminal 100 is connected to the detected image forming apparatus 300 in the peer-to-peer manner.

Figure 5:
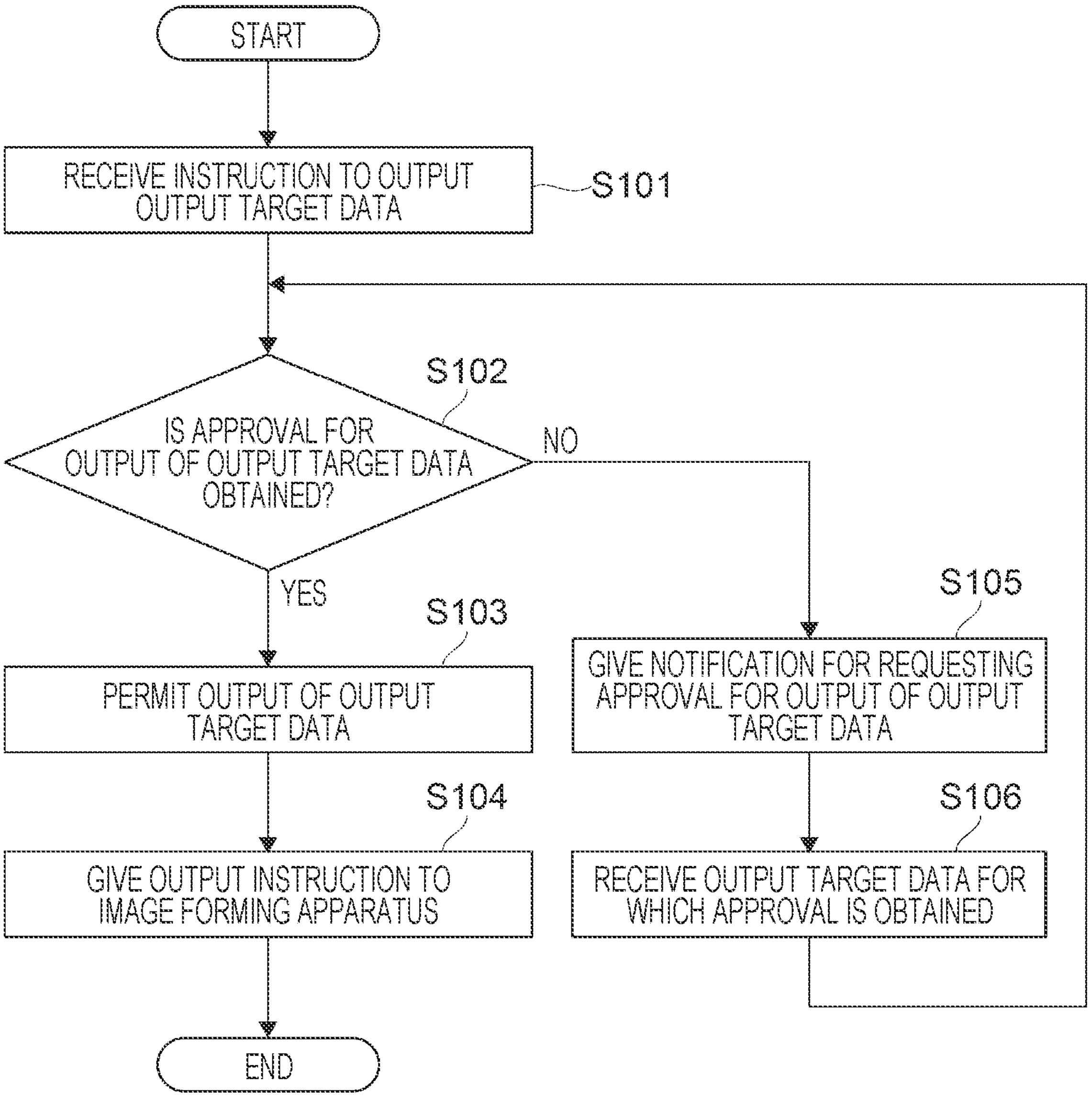
FIG. 5 is a flowchart presenting an operation of the user terminal.

FIG. 5 is a flowchart presenting the operation of the user terminal 100.

The operation of the user terminal 100 by the user is performed, and the information input and output unit 120 of the user terminal 100 receives an instruction to output the output target data (S101). The output target data approval determination unit 150 of the user terminal 100 determines whether or not the approval for the output of the output target data by the approver is obtained. In a case where the approval for the output is obtained (YES in S102), the controller 130 of the user terminal 100 permits the output of the output target data by the image forming apparatus 300 connected to the user terminal 100 in the peer-to-peer manner (S103). The user terminal 100 gives an instruction to output the output target data to the image forming apparatus 300 (S104). In the processing of S104, when the user terminal 100 gives the instruction to output the output target data to the image forming apparatus 300, the image forming apparatus 300 prints the output target data.

On the other hand, in a case where the approval for the output is not obtained (NO in S102), the user terminal 100 gives the notification for requesting the approval for the output of the output target data to the approver terminal 200 (S105). When the approver approves the output of the output target data, the approver terminal 200 transmits the output target data for which the approval by the approver is obtained. The user terminal 100 receives the output target data for which the approval by the approver is obtained from the approver terminal 200 (S106). When the user terminal 100 receives the output target data for which the approval by the approver is obtained, the process proceeds to S102. Since the received output target data is approved by the approver, the controller 130 of the user terminal 100 permits the output of the output target data (YES in S102 and S103). The user terminal 100 gives the instruction to output the output target data to the image forming apparatus 300 (S104), and the image forming apparatus 300 prints the output target data.

Modification Example

In the above-described example, the approval by the approver is required as a condition for permitting the output of the output target data by the image forming apparatus 300 connected in the peer-to-peer manner. On the other hand, a case where the output is performed within the organization to which the user belongs may be set as the condition for permitting the output of the output target data. This is because, when the output is performed within the organization to which the user belongs, the security risk of leakage of confidential information is reduced, and convenience of the user is improved. Hereinafter, a modification example will be described. Note that, in the present modification example, the user terminal 100 and the image forming apparatus 300 are connected in the peer-to-peer manner without via the network 500. In addition, in a case where the user terminal 100 detects the image forming apparatus 300 that can be connected to the user terminal 100 in the peer-to-peer manner, the user terminal 100 acquires information on the organization set to the detected image forming apparatus 300.

In this modification example, the organization is determined prior to the presence or absence of the approval for the output target data. The user terminal 100 compares whether or not the organization acquired from the detected image forming apparatus 300 and the organization of the user terminal 100 coincide. In a case where it is determined that the organizations coincide, the output is performed within the organization to which the user belongs. In this case, the user terminal 100 does not determine the presence or absence of the approval of the output target data. On the other hand, in a case where it is determined that the organizations do not coincide, the output is not performed within the organization to which the user belongs. In this case, subsequently, the user terminal 100 determines the presence or absence of the approval of the output target data.

Figure 6:
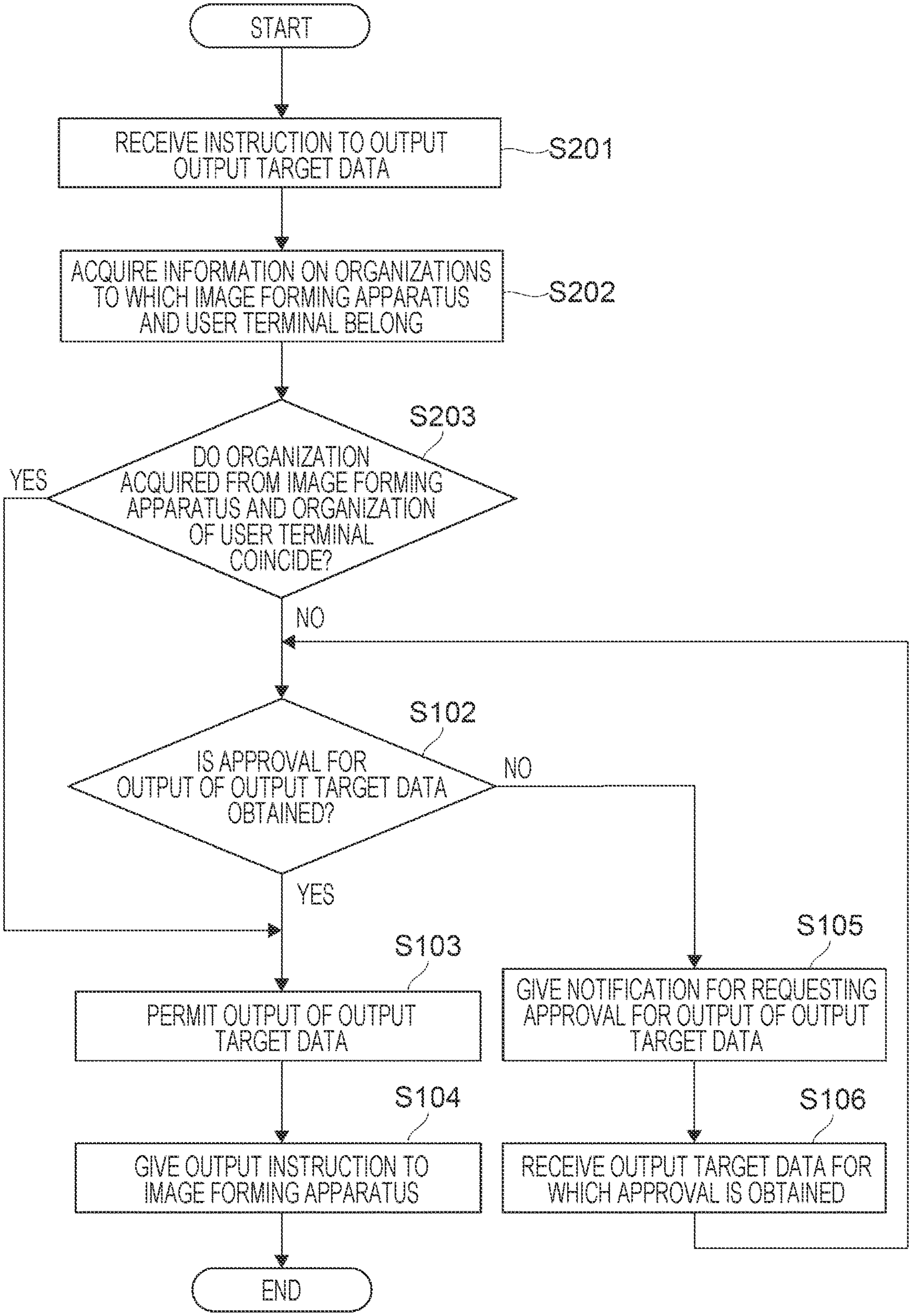
FIG. 6 is a flowchart presenting a modification example.

FIG. 6 is a flowchart presenting the modification example. The information input and output unit 120 of the user terminal 100 receives the instruction to output the output target data from the user (S201). The company information determination unit 180 of the user terminal 100 acquires the information on the organization set to the image forming apparatus 300 connected in the peer-to-peer manner and the information on the organization to which the user terminal 100 belongs (S202). Note that, in a case where the search unit 170 of the user terminal 100 acquires the information on the organization to which the image forming apparatus 300 belongs in advance when the image forming apparatus 300 is detected, and retains the information in the storage unit 140, the information may be read from the storage unit 140. Alternatively, the information on the organization to which the image forming apparatus 300 belongs may be newly acquired from the image forming apparatus 300. The company information determination unit 180 of the user terminal 100 determines whether or not the organization indicated by the information acquired from the image forming apparatus 300 and the organization of the user terminal 100 coincide. In a case where it is determined that the organizations coincide (YES in S203), the company information determination unit 180 of the user terminal 100 determines that the output is performed within the organization to which the user belongs, and permits the output of the output target data by the image forming apparatus 300 connected to the user terminal 100 in the peer-to-peer manner regardless of whether or not the approval for the output target data by the approver is obtained (S103). The user terminal 100 gives the instruction to output the output target data to the image forming apparatus 300 (S104), and the image forming apparatus 300 prints the output target data.

On the other hand, in a case where it is determined that the organizations do not coincide (NO in S203), the company information determination unit 180 of the user terminal 100 determines that the output is not within the organization to which the user belongs. Subsequently, similarly to the processing in FIG. 5, the output target data approval determination unit 150 determines whether or not the approval for the output of the output target data by the approver is obtained.

In a case where the approval for the output is obtained (YES in S102), the output of the output target data is permitted, and the instruction to output the output target data to the image forming apparatus 300 is given (S103 and S104). The image forming apparatus 300 prints the output target data.

In a case where the approval for the output is not obtained (NO in S102), the notification for requesting the approval for the output of the output target data is given to the approver terminal 200 (S105). Upon receiving the output target data for which the approval by the approver is obtained from the approver terminal 200, the user terminal 100 permits the output of the output target data (S106, YES in S102, and S103). The user terminal 100 gives the instruction to output the output target data to the image forming apparatus 300 (S104), and the image forming apparatus 300 prints the output target data.

Here, in the above-described flow, in a case where the approval by the approver is not obtained for some reason, a situation in which the user cannot output the output target data may occur. The some reason includes, for example, that the approval cannot be performed due to absence of the approver. In such a case, a configuration may be adopted in which an approval for output of data expected to be output is obtained in advance from the approver. Accordingly, the user can print the output target data.

Although the exemplary embodiment of the present disclosure has been described above, the technical scope of the present disclosure is not limited to the above-described exemplary embodiment. For example, although the case where the data is printed by using the image forming apparatus 300 has been described as the output of the output target data in the present exemplary embodiment, the present disclosure is not limited thereto. For example, in a case where the output target data is displayed on a display device, in a case where voice data as the output target data is output by a voice output device, or the like, it may be determined whether or not the output is permitted in accordance with the presence or absence of the approval by the approver or in accordance with company information. In addition, although the electronic signature by the approver for the output target data has been described as the example of the processing indicating that the output target data is approved in the present exemplary embodiment, the present disclosure is not limited thereto. For example, an electronic watermark may be used as the processing indicating that the output target data is approved. In addition, the data may be encrypted by using a password defined to be used for approved data. In addition, various changes and configuration alternatives that do not depart from the scope of the technical spirit of the present disclosure are included in the present disclosure.

APPENDIX (((1)))

An information processing system comprising:

one or more processors configured to:

determine whether or not an approval for output of output target data by a third party having an approval authority is obtained for the output target data;

permit the output of the output target data in a case where the approval for the output of the output target data using an output device connected to an apparatus including the one or more processors in a peer-to-peer manner is obtained; and not permit the output of the output target data in a case where the approval is not obtained.

(((2)))

The information processing system according to (((1))), wherein the one or more processors are configured to:

give, to the third party having the approval authority, a notification for requesting an approval for the output of the output target data in a case where the approval for the output target data is not obtained.

(((3)))

The information processing system according to (((1))) or (((2))), wherein the one or more processors are configured to:

extract identification information of the third party recorded in the output target data, and give a notification to the third party specified by the extracted identification information.

(((4)))

The information processing system according to any one of (((1))) to (((3))), wherein the one or more processors are configured to:

search for an output device that is able to be connected in a peer-to-peer manner via a communication line used for peer-to-peer connection in a case where connection with an output device managed by a server via a network is not able to be established by using a connection method for connection with the output device; and determine whether or not the approval for the output target data is obtained in a case where the output device that is able to be connected in the peer-to-peer manner is detected.

(((5)))

The information processing system according to any one of (((1))) to (((4))), wherein the one or more processors are configured to:

acquire information indicating an organization to which the output device belongs from the detected output device; and permit the output of the output target data by the output device regardless of whether or not the approval for the output target data is obtained in a case where the organization indicated by the acquired information and an organization to which the apparatus belongs coincide.

(((6)))

The information processing system according to any one of (((1))) to (((5))), wherein the output target data for which the approval by the third party having the approval authority is obtained is data including information indicating that processing is performed by the third party, and the one or more processors are configured to:

permit the output of the output target data by the output device connected to the apparatus in the peer-to-peer manner in a case where the information indicating that processing is performed by the third party is extracted from the output target data.

(((7)))

The information processing system according to (((6))), wherein the processing performed on the data by the third party having the approval authority is an electronic signature by a secret key of the third party, and the one or more processors are configured to:

permit the output of the output target data by the output device connected to the apparatus in the peer-to-peer manner in a case where a fact that the electronic signature by the third party is attached to the output target data is verified.

(((8)))

A program causing a computer to execute a process comprising:

determining whether or not an approval for output of output target data by a third party having an approval authority is obtained for the output target data; and permitting the output of the output target data in a case where the approval for the output of the output target data using an output device connected to the computer in a peer-to-peer manner, and not permitting the output of the data in a case where the approval is not obtained.

What is claimed is:

1. An information processing system comprising:

one or more processors configured to:

determine whether or not an approval for output of output target data by a third party having an approval authority is obtained for the output target data;

permit connection with an output device used for outputting the output target data for which the approval is obtained, in a peer-to-peer manner, as one of methods for connection with the output device;

not permit connection with an output device used for outputting the output target data for which the approval is not obtained, in a peer-to-peer manner, as a method for connection with the output device;

extract identification information of the third party recorded in the output target data; and give, to the third party specified by the identification information which has been extracted and having the approval authority, a notification for requesting the approval for the output of the output target data in a case where the approval for the output target data is not obtained.

2. The information processing system according to claim 1, wherein the one or more processors are configured to:

search for the output device that is able to be connected in a peer-to-peer manner via a communication line used for peer-to-peer connection in a case where connection with the output device managed by a server via a network is not able to be established by using a connection method for the connection with the output device; and determine whether or not the approval for the output target data is obtained in a case where the output device that is able to be connected in the peer-to-peer manner is detected.

3. The information processing system according to claim 2, wherein the one or more processors are configured to:

acquire information indicating an organization to which the output device belongs from the detected output device; and permit the connection with the output device in the peer-to-peer manner regardless of whether or not the approval for the output target data is obtained in a case where the organization indicated by the acquired information and the organization to which an apparatus including the one or more processors belongs coincide.

4. The information processing system according to claim 1, wherein the output target data for which the approval by the third party having the approval authority is obtained is data including information indicating that processing is performed by the third party, and the one or more processors are configured to:

permit the connection with the output device in the peer-to-peer manner for the output of the output target data in a case where the information indicating that processing is performed by the third party is extracted from the output target data.

5. The information processing system according to claim 4, wherein the processing performed on the data by the third party having the approval authority is an electronic signature by a secret key of the third party, and the one or more processors are configured to:

permit the connection with the output device in the peer-to-peer manner for the output of the output target data in a case where a fact that the electronic signature by the third party is attached to the output target data is verified.

6. A non-transitory computer readable medium storing a program causing a computer to execute a process comprising:

determining whether or not an approval for output of output target data by a third party having an approval authority is obtained for the output target data;

permitting connection with an output device used for outputting the output target data for which the approval is obtained, in a peer-to-peer manner, as a method for connection with the output device;

not permitting connection with an output device used for outputting the output target data for which the approval is not obtained, in a peer-to-peer manner, as a method for connection with the output device;

extracting identification information of the third party recorded in the output target data; and giving, to the third party specified by the identification information which has been extracted and having the approval authority, a notification for requesting the approval for the output of the output target data in a case where the approval for the output target data is not obtained.

* * * * *